(12) United States Patent
Andersson

(10) Patent No.: US 8,439,417 B2
(45) Date of Patent: May 14, 2013

(54) MULTI FUNCTIONAL DEVICE FOR A CENTER STACK

(75) Inventor: Martin Andersson, Trollhättan (SE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/952,004

(22) Filed: Nov. 22, 2010

(65) Prior Publication Data

US 2011/0121598 A1    May 26, 2011

(30) Foreign Application Priority Data

Nov. 24, 2009 (GB) .................................. 0920550.1

(51) Int. Cl.
*B60R 7/06* (2006.01)

(52) U.S. Cl.
USPC ................... 296/37.12; 296/37.8; 224/483

(58) Field of Classification Search ............... 296/37.12, 296/37.8, 70; 180/90; 454/69, 75; 224/400, 224/483
See application file for complete search history.

(56) References Cited

U.S. PATENT DOCUMENTS

| | | | |
|---|---|---|---|
| 4,983,951 A * | 1/1991 | Igarashi et al. | 340/461 |
| 5,184,489 A * | 2/1993 | Squires et al. | 296/37.12 |
| 5,808,373 A | 9/1998 | Hamanishi et al. | |
| 6,092,705 A * | 7/2000 | Meritt | 224/275 |
| 6,176,534 B1 | 1/2001 | Duncan | |
| 6,719,343 B2 * | 4/2004 | Emerling et al. | 296/24.34 |
| 7,004,527 B2 * | 2/2006 | Niwa et al. | 296/37.8 |
| 7,019,794 B2 * | 3/2006 | Norvell et al. | 348/838 |
| 7,055,883 B2 * | 6/2006 | Tokutomi et al. | 296/37.8 |
| 7,063,370 B2 * | 6/2006 | Schmidt et al. | 296/70 |
| 7,084,932 B1 * | 8/2006 | Mathias et al. | 348/837 |
| 7,168,749 B2 | 1/2007 | Schmidt et al. | |
| 7,568,663 B2 | 8/2009 | Takagi et al. | |
| 7,591,508 B2 * | 9/2009 | Chang | 297/217.3 |
| 7,685,901 B2 | 3/2010 | Leopold et al. | |
| 7,722,107 B2 * | 5/2010 | Sato et al. | 296/70 |
| 2003/0052129 A1 * | 3/2003 | Fukuo | 296/37.12 |
| 2003/0137584 A1 * | 7/2003 | Norvell et al. | 348/61 |
| 2004/0189797 A1 * | 9/2004 | Todd et al. | 348/61 |
| 2006/0060620 A1 * | 3/2006 | Schmidt et al. | 224/275 |
| 2006/0061123 A1 * | 3/2006 | Schmidt et al. | 296/70 |
| 2007/0108788 A1 * | 5/2007 | Shalam et al. | 296/37.15 |

(Continued)

FOREIGN PATENT DOCUMENTS

| | | |
|---|---|---|
| DE | 19749365 A1 | 5/1999 |
| DE | 19936206 A1 | 2/2000 |

(Continued)

OTHER PUBLICATIONS

UK IPO, British Search Report dated Mar. 3, 2010 for British Application No. GB0920550.1.

*Primary Examiner* — Lori Lyjak
(74) *Attorney, Agent, or Firm* — Ingrassia Fisher & Lorenz, P.C.

(57) ABSTRACT

A multi-functional device for a center stack of a vehicle and a center stack include, but are not limited to a storage room and a control panel, which is movable in an opened position and in a closed position. In the closed position the storage room is covered by the control panel. The storage room provides a connection element for multimedia devices and the multimedia devices are detachable from the connection element.

19 Claims, 4 Drawing Sheets

U.S. PATENT DOCUMENTS

| | | |
|---|---|---|
| 2008/0025526 A1 | 1/2008 | Iwade |
| 2008/0067842 A1* | 3/2008 | Chang .................. 297/217.3 |
| 2008/0284198 A1 | 11/2008 | Ryu |
| 2010/0264683 A1 | 10/2010 | Aro |
| 2011/0247770 A1 | 10/2011 | Dietzel et al. |

FOREIGN PATENT DOCUMENTS

| | | |
|---|---|---|
| DE | 10100931 A1 | 10/2001 |
| DE | 10217365 C1 | 8/2003 |
| DE | 10328469 A1 | 1/2005 |
| DE | 102005042118 A1 | 3/2006 |
| DE | 102005044605 A1 | 3/2006 |
| DE | 102005055457 A1 | 6/2006 |
| DE | 102005062316 A1 | 6/2007 |
| DE | 102008053734 A1 | 5/2010 |
| DE | 102008057786 A1 | 6/2010 |
| FR | 2747347 A1 | 10/1997 |
| FR | 2771354 A1 | 5/1999 |
| FR | 2831499 A1 * | 5/2003 |
| GB | 2418188 A | 3/2006 |
| GB | 2418190 A | 3/2006 |
| GB | 2420454 A | 5/2006 |
| GB | 2421362 A | 6/2006 |
| GB | 2466448 A | 6/2010 |
| JP | 2005008663 A | 1/2005 |
| JP | 2007176482 A | 7/2007 |
| WO | 0108927 A1 | 2/2001 |
| WO | 2004024509 A1 | 3/2004 |
| WO | 2008114978 A1 | 9/2008 |

* cited by examiner

MULTI FUNCTIONAL DEVICE FOR A CENTER STACK

CROSS-REFERENCE TO RELATED APPLICATION

This application claims priority to British Patent Application No. 0920550.1, filed Nov. 24, 2009, which is incorporated herein by reference in its entirety.

TECHNICAL FIELD

The technical field relates to a multi functional device for a center stack of a vehicle comprising a storage room and a movable control panel.

BACKGROUND

Movable panels are increasingly common in vehicle panel assemblies, such as instrument panels for the climate control, audio, video, or global positioning systems of a vehicle. Movable panels are generally movable to an open position to reveal additional controls or screens for controlling or monitoring a vehicle system. The movable panel may have controls and/or screens mounted thereon for use when the movable panel is in either or both of the open position and a closed position. The additional controls or screens are generally in a fixed position behind the movable panel.

In view of the foregoing, it is at least one object to provide a multi functional device for a center stack, with a storage room behind the control panel, which provides an improved functionality.

SUMMARY

The multi functional device for a center stack of a vehicle according to an embodiment of the invention comprises a storage room and a control panel, which is movable in an opened position and in a closed position, wherein in the closed position the storage room is covered by the control panel. The storage room provides a connection element for multimedia devices, and the multimedia devices are detachable from the connection element.

The storage room enables additional volume for storing and connecting multimedia devices like a CD-driver, a DVD-driver or a MP3-player. The storage room provides at least one connection element, with which these multimedia devices can be connected. Preferably, more than one connection is provided, wherein the connection is preferably an outlet, like a power outlet. If the multimedia devices are not used any more they can be detached from the connection element and can be removed from the storage room. It is also possible to store other articles than multimedia devices in this storage room, like sun glasses, keys, handys (i.e., cell phones). The storage room can be used as a hidden storage in a primary area for the customer. The CD-driver may be packaged behind the control panel in the storage room to give a clean modern look of the center stack. The customer is able to connect and to store multimedia devices in a hidden area when the control panel is in the closed position. Thus, the multimedia devices stored in this storage room are not visible from outside the car. The control panel is movable parallel to the center stack, so that in the opened position the control panel is still usable for the customer. The multi functional device provides a high functionality for the customer, since any multimedia device can be connected when it is needed and afterwards can be detached from the connection element when it is not needed any more.

According to an embodiment the storage room provides more than one chamber. Between the chambers an opening for cables is provided. The chambers enable a separate storage of different multimedia devices or articles in the storage room so that a systematical assembly of the multimedia devices or articles is possible. To be able to connect the multimedia devices with each other or with the connection elements, an opening at a side surface of the chambers is provided where cables can be through guided.

For moving the control panel in an opened position and in a closed position a first chain guide is preferably provided. The first chain guide comprises a chain that is preferably guided in a tube-shaped channel. One first chain guide is provided at the center stack at two side surfaces of the storage room, respectively. The channel of the first chain guide is preferably V-shaped with two rounded end sections, so that the distance between the control panel and the center stack is enlarged by moving from the closed position to the opened position. Using a chain guide for moving the control panel provides a simple and very reliable handling of the multi functional device.

Further, according to an embodiment, a second chain guide is provided for moving the control panel. The second chain guide comprises a chain that is preferably guided in a tube-shaped channel. One second chain guide is provided at the center stack at two side surfaces of the storage room, respectively. The second chain guide may guarantee a parallel movement of the control panel to the center stack. Moreover, the second chain guide provides stability for a secured and guided movement of the control panel. The second chain guide is preferably L-shaped and preferably arranged beneath the first chain guide at each side surface and the channel and the chain of the first chain guide is longer than the channel and the chain of the second chain guide. By using a first chain guide and a second chain guide at each of the two side surfaces of the storage room a very stable and secured movement of the control panel can be provided.

Preferably, the control panel provides two side faces which are fixed to the first chain guide and to the second chain guide. The side faces are preferably formed like arms which are mounted at the control panel. The side faces of the control panel preferably extend into the center stack along the side surfaces of the storage room where the first chain guide and the second chain guide is arranged. The side faces of the control panel are preferably pin-jointed with the chain of the first chain guide and with the chain of the second chain guide. Preferably, the side faces are fixed centered along the length of the chain of the first chain guide and along the length of the second chain guide.

According to an embodiment, a drive unit is provided for moving the control panel in the opened position and in the closed position. The drive unit is preferably arranged at the first chain guide to realize a movement of the chain inside the channel. The drive unit may comprise for example a spring-loaded drive system or an electric motor. Moreover, a center stack of a vehicle is provided that comprise a multi functional device as described above.

BRIEF DESCRIPTION OF THE DRAWINGS

The embodiments will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
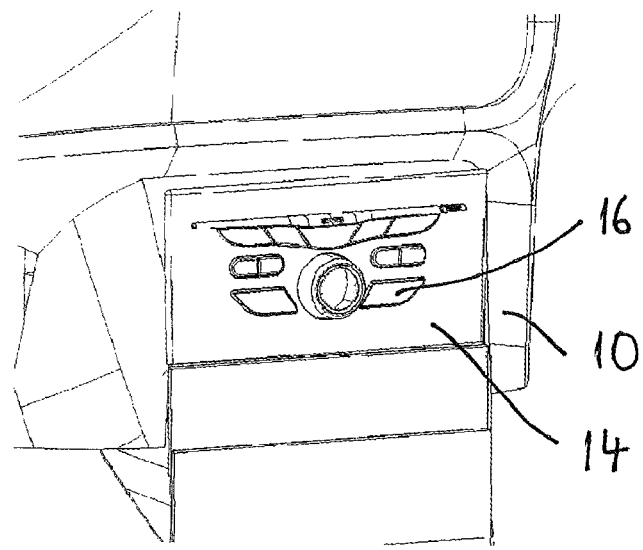
FIG. 1 shows a front view of a multi functional device according to an embodiment with a control panel in a closed position.

FIG. 1 shows an embodiment of a multi functional device that is integrated in a center stack 10 of a vehicle. The multi functional device comprises a storage room 12, as it can be seen in FIG. 2, and a control panel 14 which can be moved in a closed position and in an opened position. In the closed position the storage room 12 is covered by the control panel 14, as it is shown in FIG. 1. The control panel 14 comprises some operator buttons 16, for example for a radio, an air conditioner, a seat heater or something else.

Figure 2:
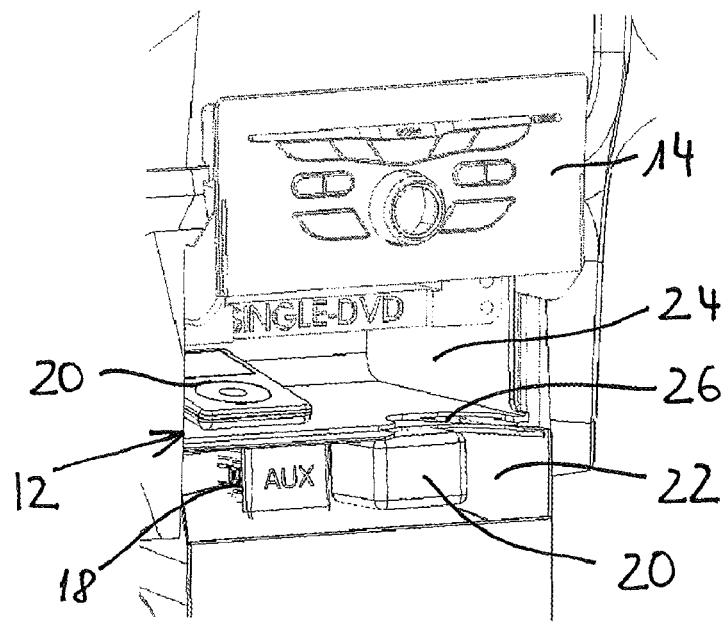
FIG. 2 shows a front view of the multi functional device with the control panel in an opened position.

In FIG. 2 the control panel 14 is moved in the opened position, so that a customer can reach into the storage room 12. The storage room 12 provides connection elements 18 for different multimedia devices 20, for example for a MP3-player and an USB-stick. The storage room 12 provides two chambers 22, 24, wherein between the two chambers 22, 24 an opening 26 for cables is provided.

Figure 3:
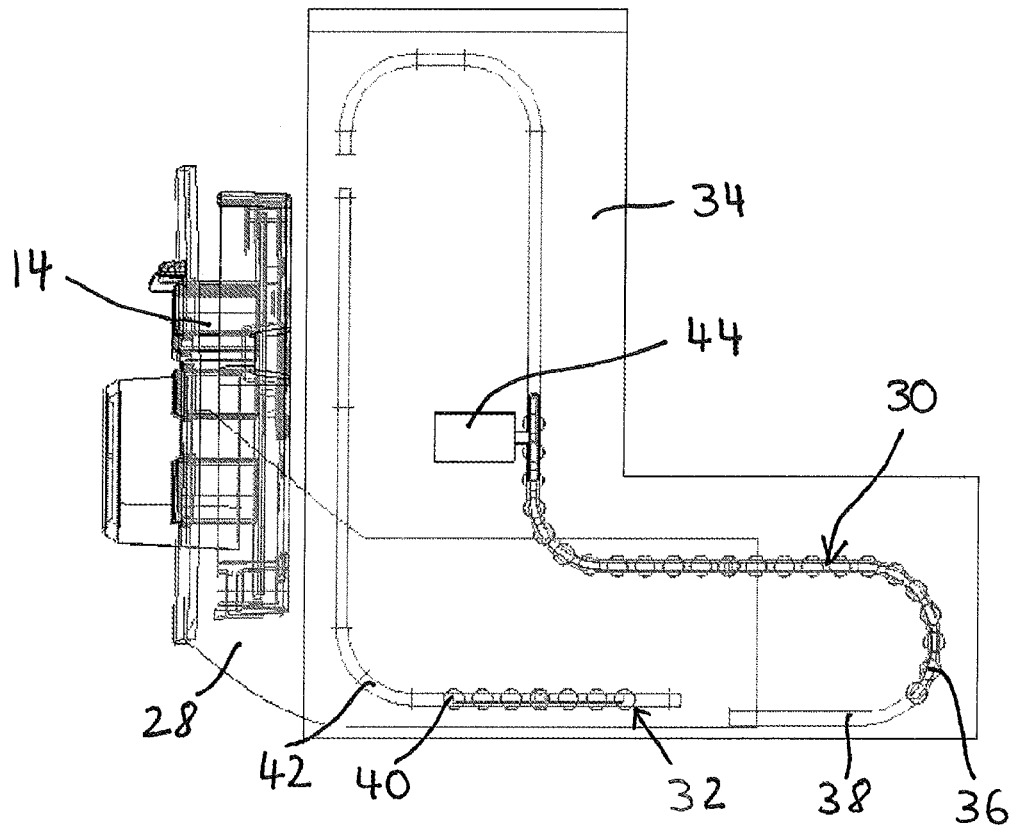
FIG. 3 shows a side view of the multi functional device with the control panel in the closed position.

FIG. 3 shows a side view of the multi functional device with the control panel 14 in the closed position. The control panel 14 provides two side faces 28 shaped as arms, which are guided in a first chain guide 30 and in a second chain guide 32 for moving the control panel 14. The first chain guide 30 and the second chain guide 32 are provided at two side surfaces 34 of the storage room 12 respectively.

Figure 4:
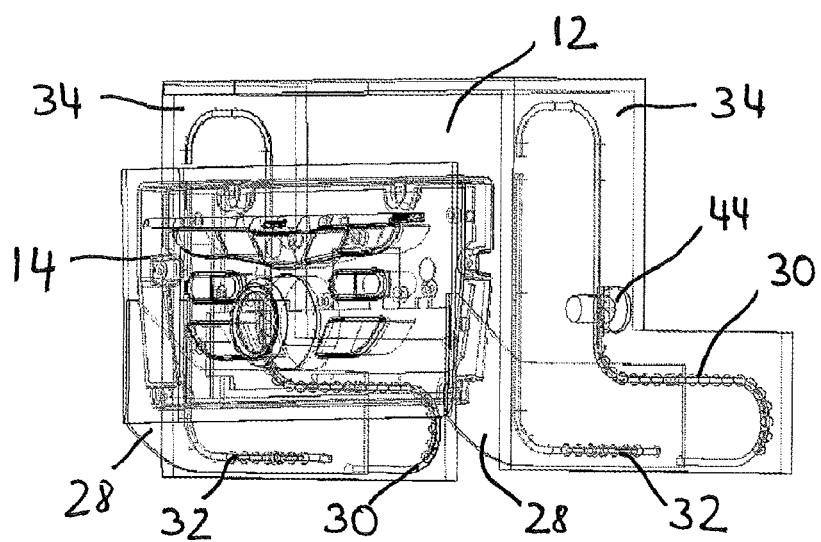
FIG. 4 shows a perspective view of the multi functional device with the control panel in the closed position.

The first chain guide 30 comprises a chain 36 which is guided in a tube-shaped channel 38. The channel 38 of the first chain guide 30 is V-shaped with two rounded end sections, so that the distance between the control panel 14 and the center stack 10 is enlarged by moving from the closed position to the opened position. The second chain guide 32 also comprises a chain 40 which is guided in a tube-shaped channel 42. The second chain guide 32 is L-shaped, wherein the second chain guide 32 is arranged beneath the first chain guide 30 and the channel 38 and the chain 36 of the first chain guide 30 is longer than the channel 42 and the chain 40 of the second chain guide 32. By using a first chain guide 30 and a second chain guide 32 at each of the two side surfaces 34 of the storage room 12 a very stable and secured movement of the control panel 14 can be provided. FIG. 4 shows the multi functional device shown in FIG. 3 in a perspective view. The first chain guide 30 is driven by a drive unit 44, for example a motor unit. Since the control panel 14 is fixed to the first chain guide 30 and to the second chain guide 32, it is sufficient to impel only one chain guide 30, 32 directly. Preferably, the drive unit comprises a cogwheel, which pulls the chain 36 up and down inside the channel 38.

Figure 5:
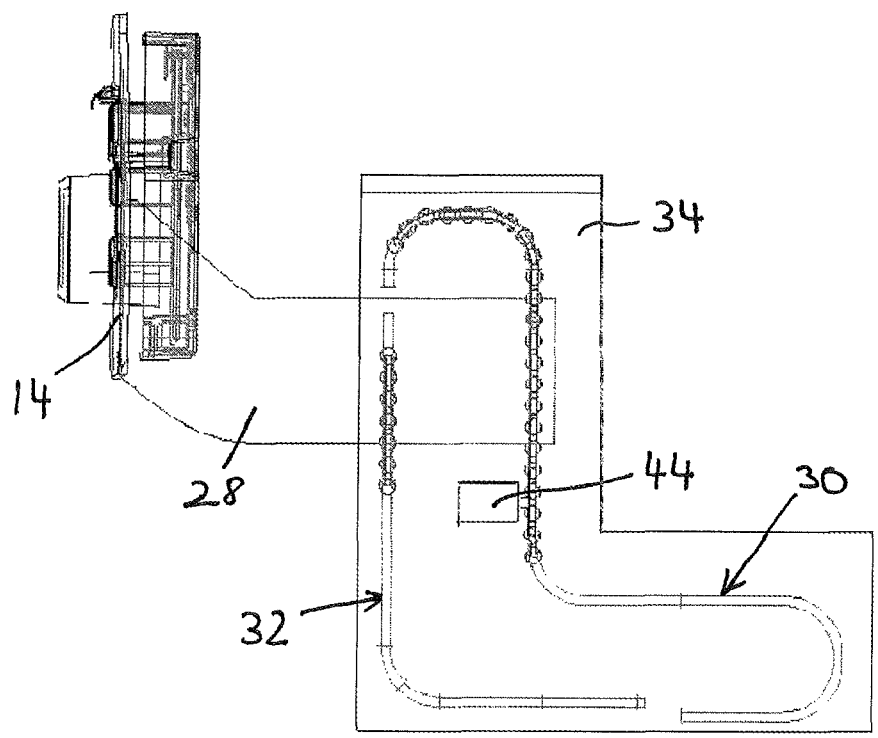
FIG. 5 shows a side view of the multi functional device with the control panel in the opened position.
Figure 6:
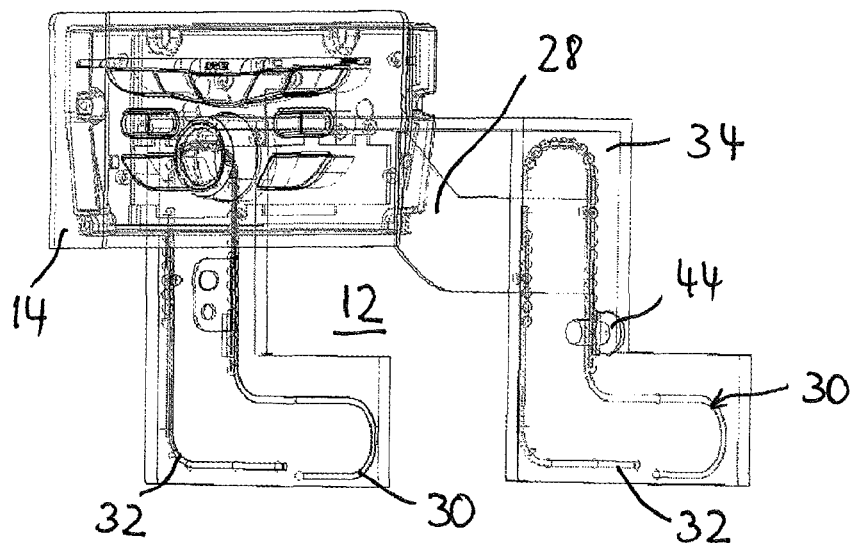
FIG. 6 shows a perspective view of the multi functional device with the control panel in the opened position.
Figure 7:
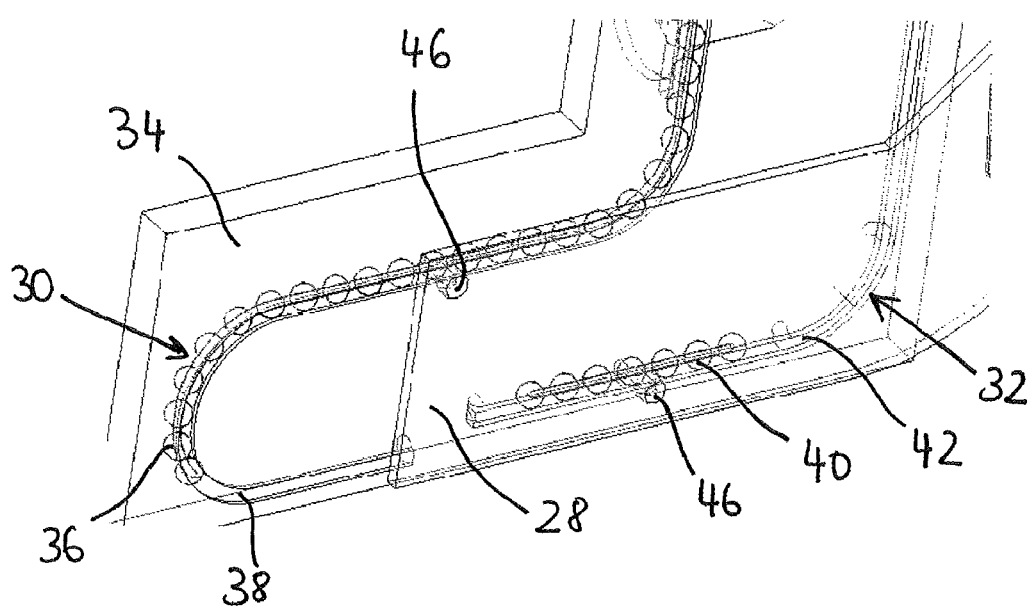
FIG. 7 shows a perspective view of the chain guides.

In FIG. 5 and FIG. 6 the multi function device is shown with the control panel 14 in an opened position. FIG. 7 shows a perspective view of the first chain guide 30 and the second chain guide 32. It is shown that each side face 34 of the control panel 14 is fixed to the chains 36, 40 by pins 46, wherein the pins 46 are arranged centered along the length of the chains 36, 40.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A multi-functional device for a center stack of a vehicle, comprising:
   a storage room for the center stack, the storage room configured to store a multimedia device;
   a connection element provided by the storage room, the connection element attachable and detachable to the multimedia device;
   a control panel adapted to provide an opened position and a closed position, the closed position adapted to cover the storage room with the control panel;
   a first chamber of the storage room;
   a second chamber of the storage room; and
   an aperture between the first chamber and the second chamber.

2. The multi-functional device according to claim 1, further comprising a first chamber of the storage room, the first chamber configured to store the multimedia device, and the connection element being attachable and detachable to the multimedia device while the multimedia device is stored in the first chamber.

3. The multi-functional device according to claim 1, further comprising a first chain guide adapted to move the control panel.

4. The multi-functional device according to claim 3, wherein a first channel of the first chain guide is V-shaped with two rounded end sections.

5. The multi-functional device according to claim 3, further comprising a second chain guide.

6. The multi-functional device according to claim 5, wherein the second chain guide is preferably L-shaped and arranged beneath the first chain guide.

7. The multi-functional device according to claim 5, wherein a first face and a second face of the control panel are fixed to the first chain guide and to the second chain guide.

8. The multi-functional device according to claim 5, wherein a first chain of the first chain guide is longer than a second channel and a second chain of the second chain guide.

9. The multi-functional device according to claim 1, further comprising a drive unit adapted to move the control panel.

10. A vehicle center stack, comprising:
   a storage room for the vehicle center stack, the storage room configured to store a multimedia device;
   a connection element provided by the storage room, the connection element attachable and detachable to the multimedia device;

a control panel adapted to provide an opened position and a closed position, the closed position adapted to cover the storage room with the control panel; and a first chain guide adapted to move the control panel.

11. The vehicle center stack according to claim 10, further comprising a first chamber of the storage room, the first chamber configured to store the multimedia device, and the connection element being attachable and detachable to the multimedia device while the multimedia device is stored in the first chamber.

12. The vehicle center stack according to claim 10, further comprising:

a first chamber of the storage room;

a second chamber of the storage room; and an aperture between the first chamber and the second chamber.

13. The vehicle center stack according to claim 10, wherein a first channel of the first chain guide is V-shaped with two rounded end sections.

14. The vehicle center stack according to claim 10, further comprising a second chain guide.

15. The vehicle center stack according to claim 14, wherein the second chain guide is preferably L-shaped and arranged beneath the first chain guide.

16. The vehicle center stack according to claim 14, wherein a first face and a second face of the control panel are fixed to the first chain guide and to the second chain guide.

17. The vehicle center stack according to claim 14, a first chain of the first chain guide is longer than a second channel and a second chain of the second chain guide.

18. The vehicle center stack according to claim 10, further comprising a drive unit adapted to move the control panel.

19. A multi-functional device for a center stack of a vehicle, comprising:

a storage room for the center stack, the storage room configured to store a multimedia device;

a connection element provided by the storage room, the connection element attachable and detachable to the multimedia device;

a control panel adapted to provide an opened position and a closed position, the closed position adapted to cover the storage room with the control panel; and a drive unit adapted to move the control panel.

* * * * *